United States Patent [19]

Russell

[11] 4,098,170

[45] Jul. 4, 1978

[54] ENGRAVING MACHINE HAVING MINIMUM SETUP TIME

[76] Inventor: John A. Russell, 3030 S. Magnolia, Sanford, Fla. 32771

[21] Appl. No.: 580,780

[22] Filed: May 27, 1975

[51] Int. Cl.² .......................... B27C 5/02; B23Q 35/04
[52] U.S. Cl. ........................................ 90/13.1; 90/13.2; 90/DIG. 29; 144/144 A
[58] Field of Search .............. 90/13.2, 13.1, DIG. 29; 144/144 R, 144 A, 286 R, 286 A, 287; 269/305, 142, 234

[56] References Cited

U.S. PATENT DOCUMENTS

| | | | |
|---|---|---|---|
| 1,869,631 | 8/1932 | Swanson | 269/234 |
| 2,303,006 | 11/1942 | Swire | 90/13.2 |
| 2,646,725 | 7/1953 | Brynildsrud | 90/13.2 |
| 2,796,095 | 6/1957 | Joseph | 269/142 X |
| 3,211,061 | 10/1965 | Cretsineger | 144/144 R |
| 3,453,933 | 7/1969 | Kornhauser | 90/13.1 |
| 3,495,636 | 2/1970 | Smith | 144/144 R |
| 3,858,630 | 1/1975 | Cherry et al. | 144/144 R |

*Primary Examiner*—Leon Gilden
*Attorney, Agent, or Firm*—Julian C. Renfro

[57] ABSTRACT

An engraving machine utilizing an elongate guide letter holder, and an adjacent workpiece holder adjustably disposed essentially parallel thereto. A movably mounted router assembly, comprising a stylus and a relatedly movable router means, is operatively disposed over such holders such that an operator grasping the stylus and tracing selected guide letters disposed on the guide letter holder brings about like movements of the router with respect to the workpiece mounted on the workpiece holder, with the bit of the router being caused to cut the selected letters into the workpiece. Advantageously, each of the holders utilizes a rapidly operated locking means that simplifies the task of removably securing the selected guide letters and the selected workpiece in a desired, aligned relationship on their respective holders. By virtue of the fact that the principal components of my machine can be easily placed in a preascertained relationship with each other, my invention lends itself to use with a book of precalculated tables that serve to further reduce setup time, even when workpiece size varies from piece to piece. My invention also comprises a novel method of rapidly making signs of desired size and content, prepared by reference to such book of tables.

28 Claims, 12 Drawing Figures

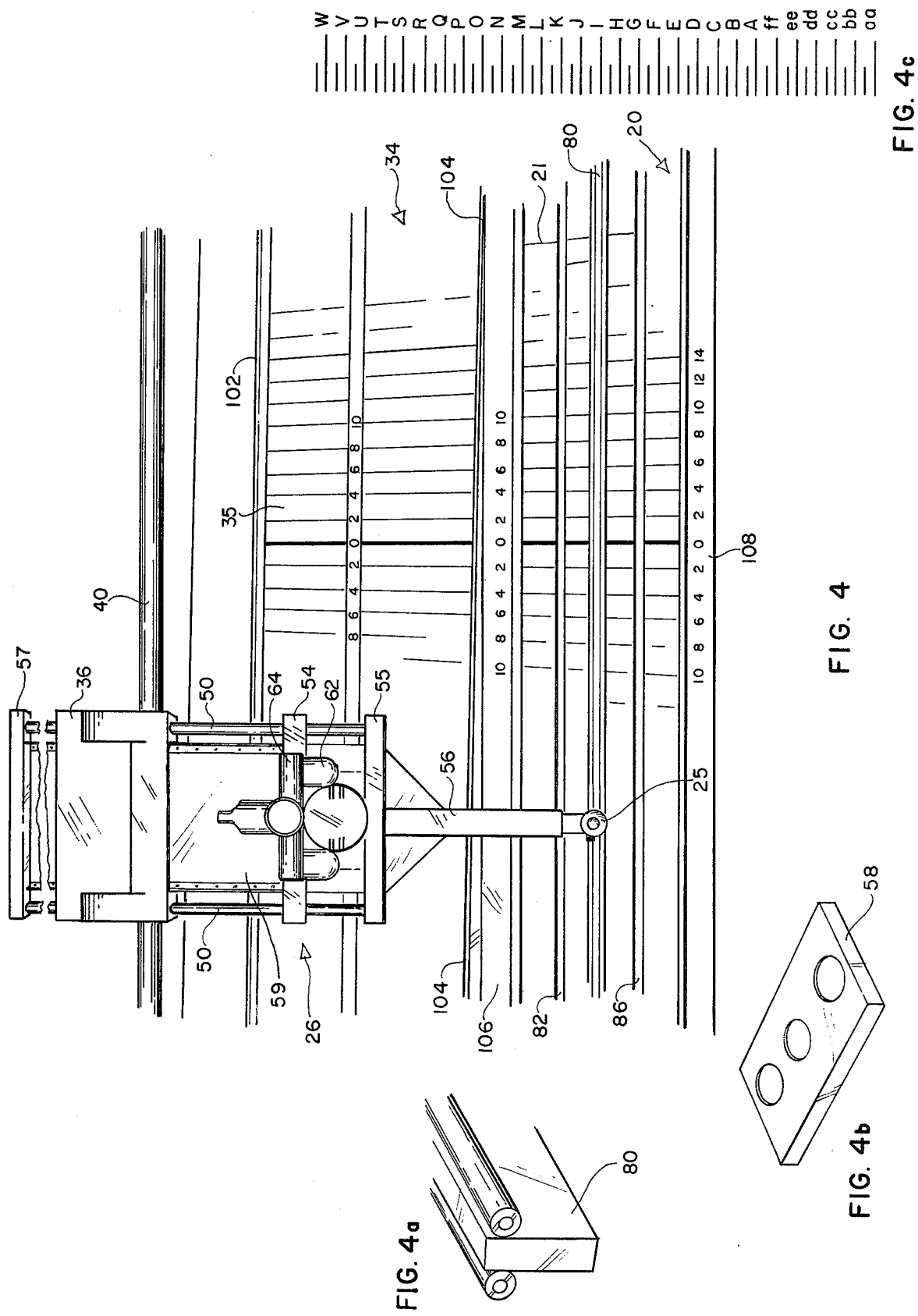

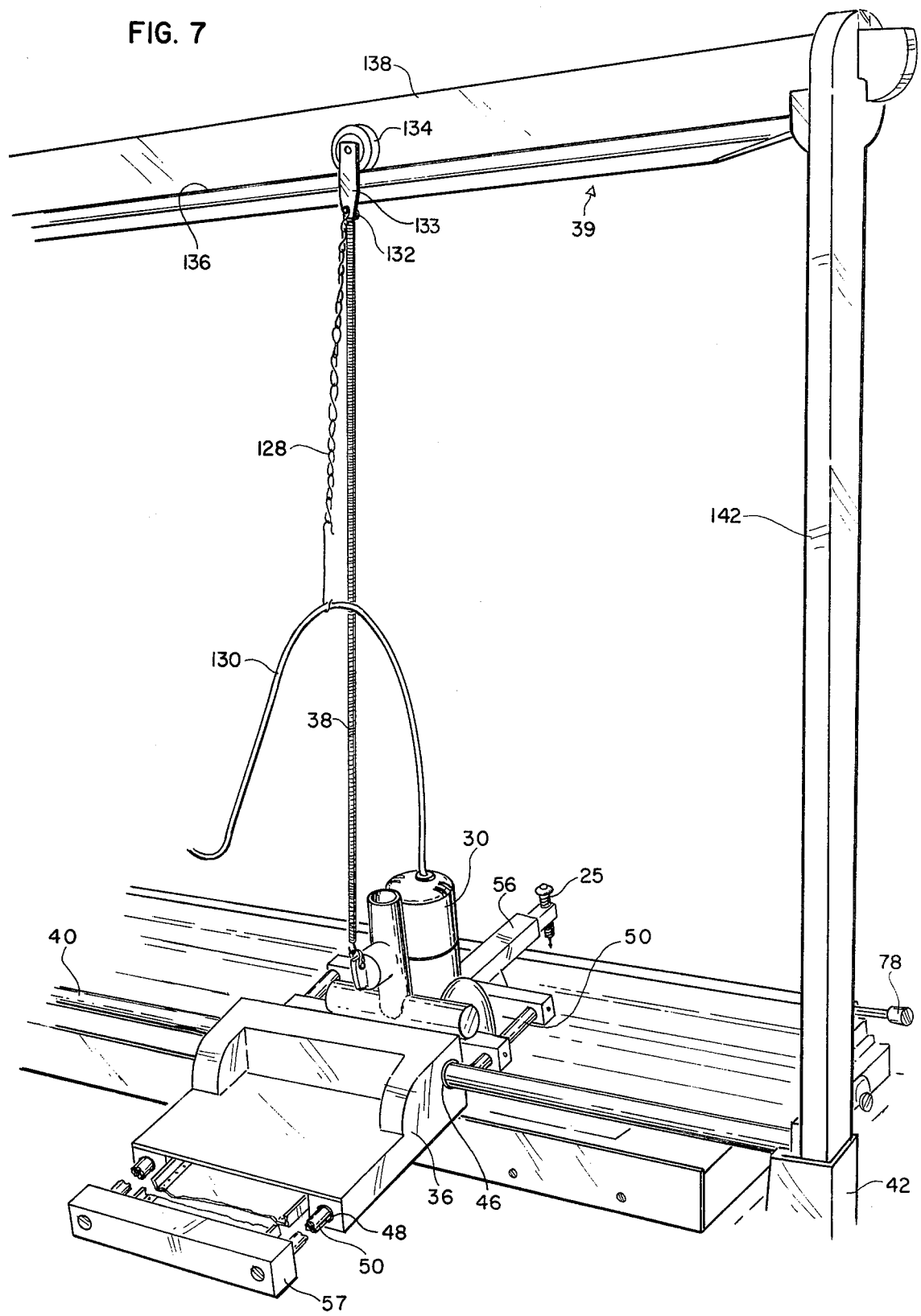

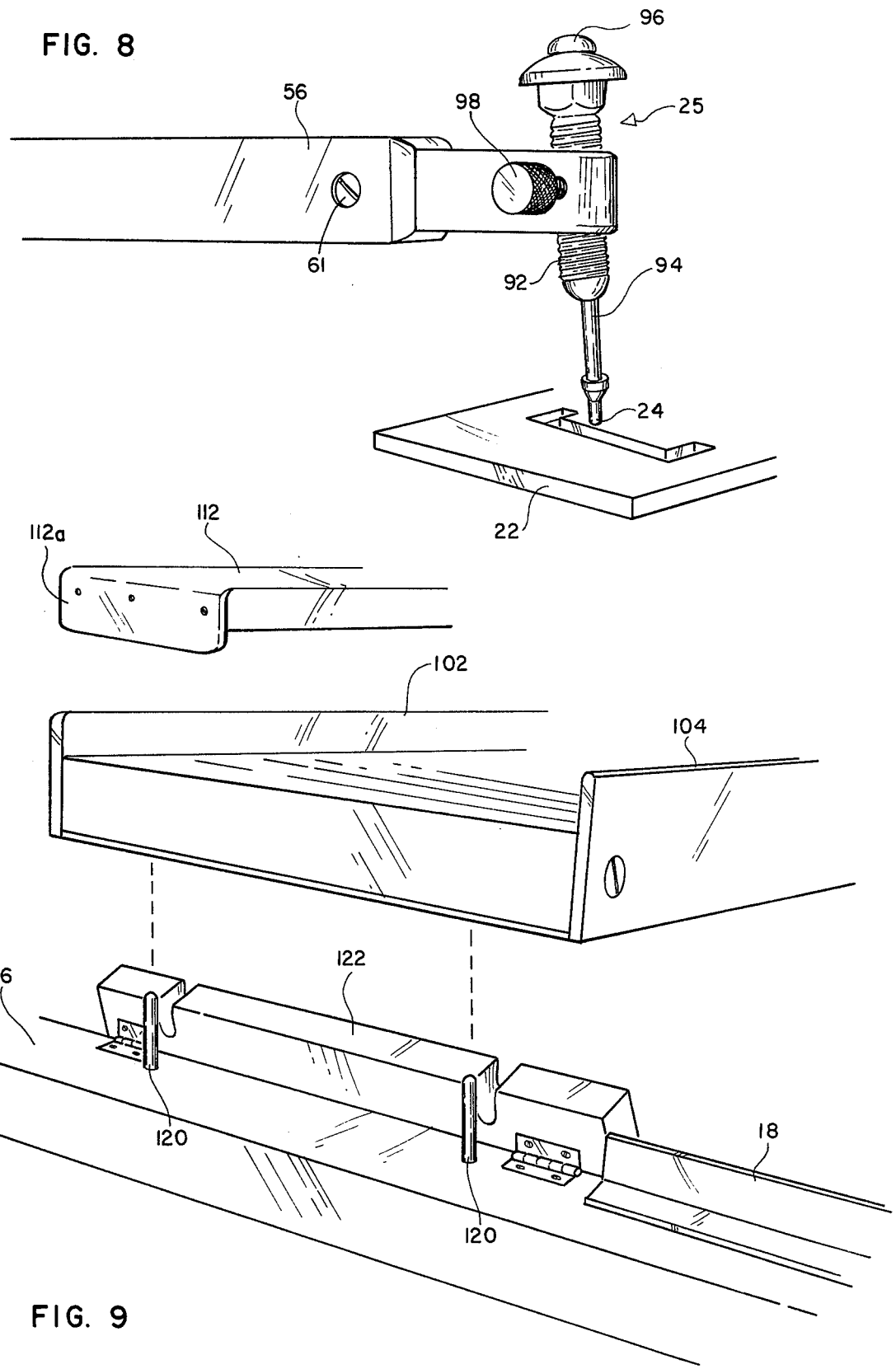

ENGRAVING MACHINE HAVING MINIMUM SETUP TIME

BACKGROUND OF THE INVENTION

It has long been known that routers and other types of electric cutting devices can be used for making signs and the like of uniform, attractive appearance, with such an operation being enhanced by the use of selected guide letters. In a typical instance, a router is incorporated into a movable, supported assembly, with a stylus being employed in operative association with the router. A substantially fixed distance typically exists between the tip of the stylus and the cutting tip of the router, so that by the operator grasping the stylus and tracing around recessed portions of the guide letters, the router is caused to undertake similar if not identical motions with respect to a workpiece clamped adjacent the assembly, and thus prepare a sign having letters or numbers of uniform appearance.

The Edwards U.S. Pat. No. 3,301,287 teaches an arrangement of this general type, in which parallelogram linkages are utilized for supporting the router and stylus. Although able to be used satisfactorily for a number of purposes, suffers from several disadvantages, including intricacy, expense, and inertia forces, but most particularly, a considerable setup time is necessarily involved in the use of such a machine.

From the standpoint of utility, I prefer a sign making apparatus more nearly resembling that taught in the Wormser U.S. Pat. No. 3,171,207, which utilizes a table across the back of which a horizontal bar of considerable length is mounted, and along which bar, a router assembly is slidable. The router is mounted so as to be movable with respect to the bar in a fore and aft sense, at the behest of the operator. However, I have found that the Wormser type of device, which utilizes a counterbalanced router assembly, is generally tiring to use, but most importantly, it emulates the earlier prior art devices in requiring that certain hand tools be utilized in the mounting of the workpiece and the guide letters, and necessarily involves an arrangement in which a number of measurements are necessary in order that the letters cut in accordance with the guide letters will be symmetrical, and disposed in a centered, attractive arrangement on the workpiece.

Accordingly, it is a primary object of my invention to provide a routing machine of non-intricate construction, adapted for the rapid production of signs and the like, that involves the use of no tools for workpiece or guide letter mounting, and entails only short setup times when using standard lumber sizes, while making possible the creation, even by one not highly skilled, of signs that are accurate, precise and attractive.

SUMMARY OF THIS INVENTION

In order to devise a machine that will quickly receive guide letters and secure same in a centered (or desirably offset) arrangement, I have provided in accordance with this invention, an elongate guide letter holder assembly having one or more tracks in which sets of letters of a selected size may be placed, and then removably and rapidly secured in operative position without the use of tools. Parallel to, and in operative relation with the guide letter holder assembly, is an elongate workpiece holder assembly, that has a provision for rapidly securing workpieces thereon, with it being easily possible to quickly shift from one size workpiece to another without the use of tools of any kind.

Because of a preascertained, centered relationship between the guide letter holder assembly and the workpiece holder assembly, when the guide letters have been centered on their supporting device, and the workpiece to be used has been centered on its supporting device, the indentations in the guide letters, upon being traced by the operator's stylus, will cause the associated router to cut the selected letters in a centered, attractive and symmetrical arrangement into the workpiece, with it rarely being necessary for the operator to perform any measurements or calculations. Because of this, operators having little or no previous training in sign making can, after a short time, turn out signs of professional quality.

Not only are the guide letter holder assembly and the workpiece holder assembly of advntageous construction from the component centering and securing standpoints, but also the preascertained relation between these two assemblies makes it possible for multiline signs to be cut with but a minimum of effort. The inherent working relationship between the guide letter holder assembly and the workpiece holder assembly comprehends the fact that the guide letter holder assembly is movable perpindicularly to its length for a limited extent with respect to the workpiece holder assembly, while at all times remaining in parallelism therewith. Suitable indicia are associated with the means upon which the guide letter holder assembly is mounted, such that by preparing a book of tables keyed to the markings on the indicia, it is possible to lay out beforehand, complete instructions for the preparation of multi-line signs. Thus, after the operator has selected the size of the letters he wil use, and decide upon the number of letters to appear in each line of the sign, he can have recourse to the tables and quickly ascertain the necessary fore or aft adjustment of the position of the guide letter holder assembly with respect to the workpiece holder assembly that is necessary when cutting each line of the sign.

Advantageously, I also provide spring assistance for the support of the router assembly in a manner most convenient for the operator, thus obviating the heavy counterbalance arrangements of the prior art that were disadvantageous from the standpoint of change in operator effort as letters were traced, and also disadvantageous from the standpoint of the substantial inertial forces that had to be taken into consideration by the operator each time his movement of the stylus involved a change of direction.

It is therefore an important object of my invention to provide a routing or engraving machine designed to engrave or cut letters or numbers in wood, plastic, soft metals or the like in a rapid and accurate manner.

It is another object of my invention to provide a routing machine of highly advantageous yet economical construction, that enables a person with minimal training to rapidly cut signs in a uniform and precise manner.

It is still another object of my invention to provide a routing machine, in the use of which no tools of any kind are required, even when changing from one workpiece size to another, and therefore having minimal setup time.

It is yet another object of this invention to provide a workpiece holder assembly and a guide letter holder assembly that are operatively disposed in a preascertained, centered relationship to each other, thus enabling an operator tracing easily centered guide letters with his stylus to be assured that the associated router bit will create properly centered letters or numbers in the workpiece used, without it being necessary for the operator to perform measurements of any kind.

It is yet still another object of my invention to provide a highly effective routing device, by the use of which an operator can prepare multi-line signs, with the preascertained relation between the guide letter holder assembly and the workpiece holder assembly being such as to permit the preparation of a book of tables, with the use of these tables enabling the operator to be assured that the several lines of the multi-line sign will be equidistant from each other as well as symmetrically disposed on the workpiece.

DRAWING DESCRIPTION

FIG. 4 is a fragmentary view of the router assembly, guide letter holder and workpiece holder, taken to a larger scale;

FIG. 4a is a fragmentary view of the divider bar, taken to a still larger scale;

FIG. 4b is a view to a small scale of the router motor support plate;

FIG. 4c is a view to full size, of the scale utilized at each end of the guide letter holder assembly, to aid the positioning thereof by the operator;

FIG. 7 is a perspective view of my machine, taken from the rear in order to reveal certain details of my novel counterbalance arrangement, utilizing a spring bias as a portion thereof;

FIG. 8 is a fragmentary view of the stylus portion of the router assembly, taken to a large scale; and FIG. 9 is an exploded view revealing some of the important details associated with the support arrangement for the workpiece holder.

GENERAL DESCRIPTION

Figure 1:
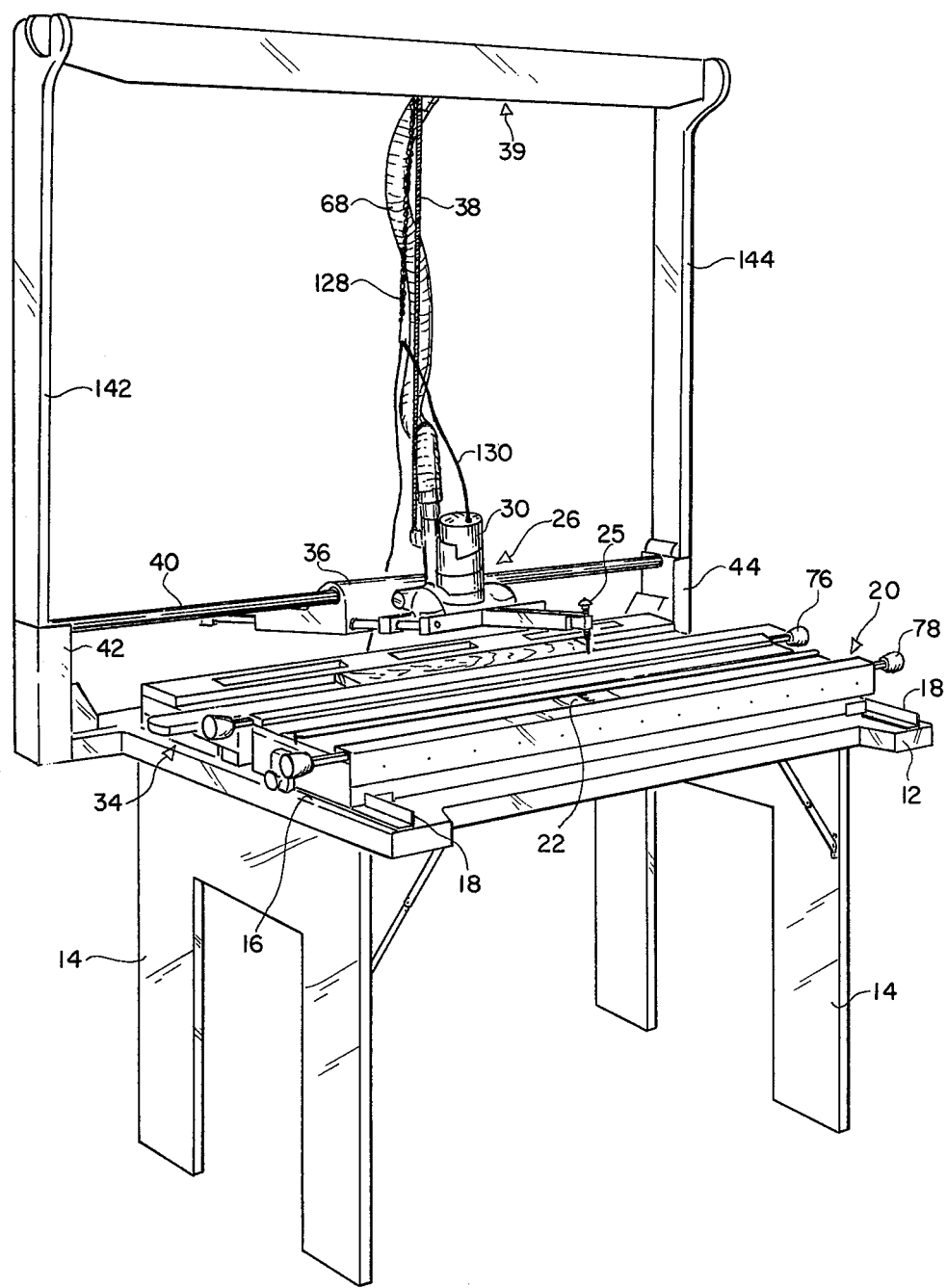
FIG. 1 is a perspective, overall view of my engraving or routing machine.

Turning to FIG. 1, a preferred embodiment of my novel routing machine principally involves a table 12, having four legs 14, and a generally planar upper surface 16. The legs are sturdy but preferably are foldable much in the nature of card table legs, thus making it as well as other portions of my device able to be associated, on occasion, in a comparatively small space. Advantageously, my machine can be quickly and easily dismantled for shipping or storage, and can thereafter be re-assembled in a very short period of time, without the use of tools or any kind, and without involving the employment of fastening devices, such as screws, bolts or nuts.

In accordance with this preferred emobdiment of my invention, I provide a guide letter holder assembly 20 whose position along the planar surface 16 can be altered by selected amounts, such as when cutting multi-line signs. To that end I provide parallel track members 18, disposed in a fore and aft relation on the upper surface 16, and it is upon these track members that the elongate guide letter holder assembly 20 is movable in what may be regarded as a fore and aft sense. As viewed in FIG. 3, the guide letter holder assembly may be regarded as elongate in the direction perpendicular to the direction of the track members 18, and I refer herein to this as being the left-right direction. As will be noted from this and other figures, upon the planar surface 21 of the guide letter holder assembly, a selected number of guide letters or templates 22 may be secured, with the characters set forth on the templates 22 being of such a nature as to be easily traced by the operator concerned with the preparation of a sign or the like. As will be noted in FIGS. 3 and 8, the templates 22 typically have recessed characters that can be engaged by a stylus 25, thus simplifying the procedure of tracing the desired characters.

Figure 2:
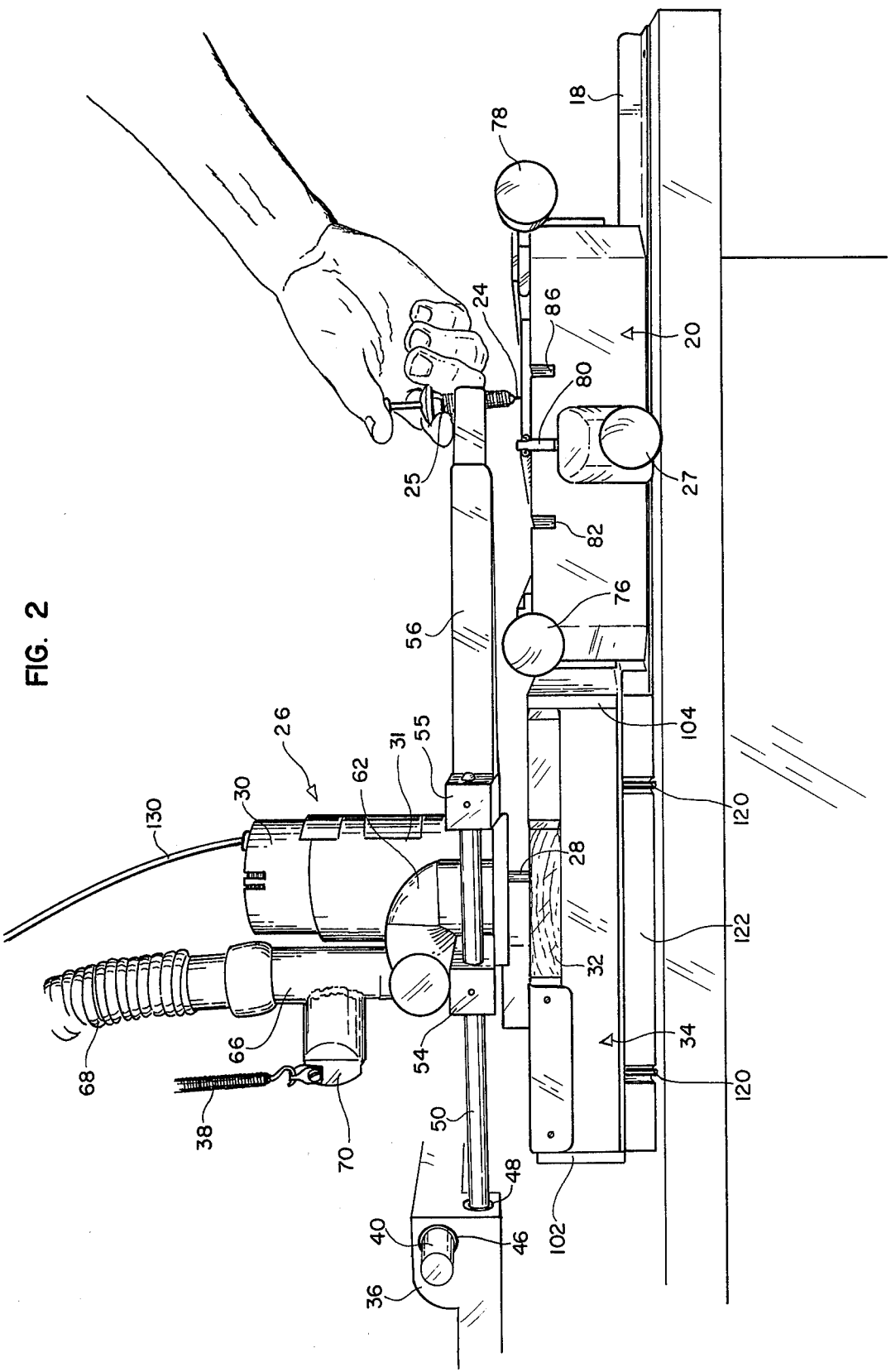
FIG. 2 is an edge view, to a larger scale, showing the relationship of the router assembly, the workpiece holder, and the guide letter holder.

FIGS. 2 and 8 reveal the tip portion 24 of the stylus engaging the recesses of a letter, with FIG. 2 illustrating the fact that the motion of the stylus by the operator controls the motion of an associated router assembly 26. The router assembly is slidably mounted on a guide bar 40 at the rear of the table member 12. The bar 40, like the guide letter holder assembly, extends in a left-right direction, and is supported slightly above the level of the planar surface 21 of the assembly 20. Along the bar 40 is slidable a carriage member 36 which, as described hereinafter, is a part of the router assembly, and forms the support means for the router device 30. Thus, as the operator moves the tip 24 of the stylus along the indentations of the selected letters or numbers, the cutter bit 28 of the router device, visible in FIG. 2, is caused to cut the same letters or numbers on the upper surface of a selected workpiece 32. As visible in FIGS. 3 and 5, the workpiece 32 is removably secured upon an elongate workpiece holder assembly 34. In the preferred embodiment, this letter assembly is not movably mounted, but height adjustments of the assembly 34 may be made when such are warranted by change to a workpiece of different thickness, which height adjustments may be made in accordance with a procedure hereinafter described.

Figure 3:
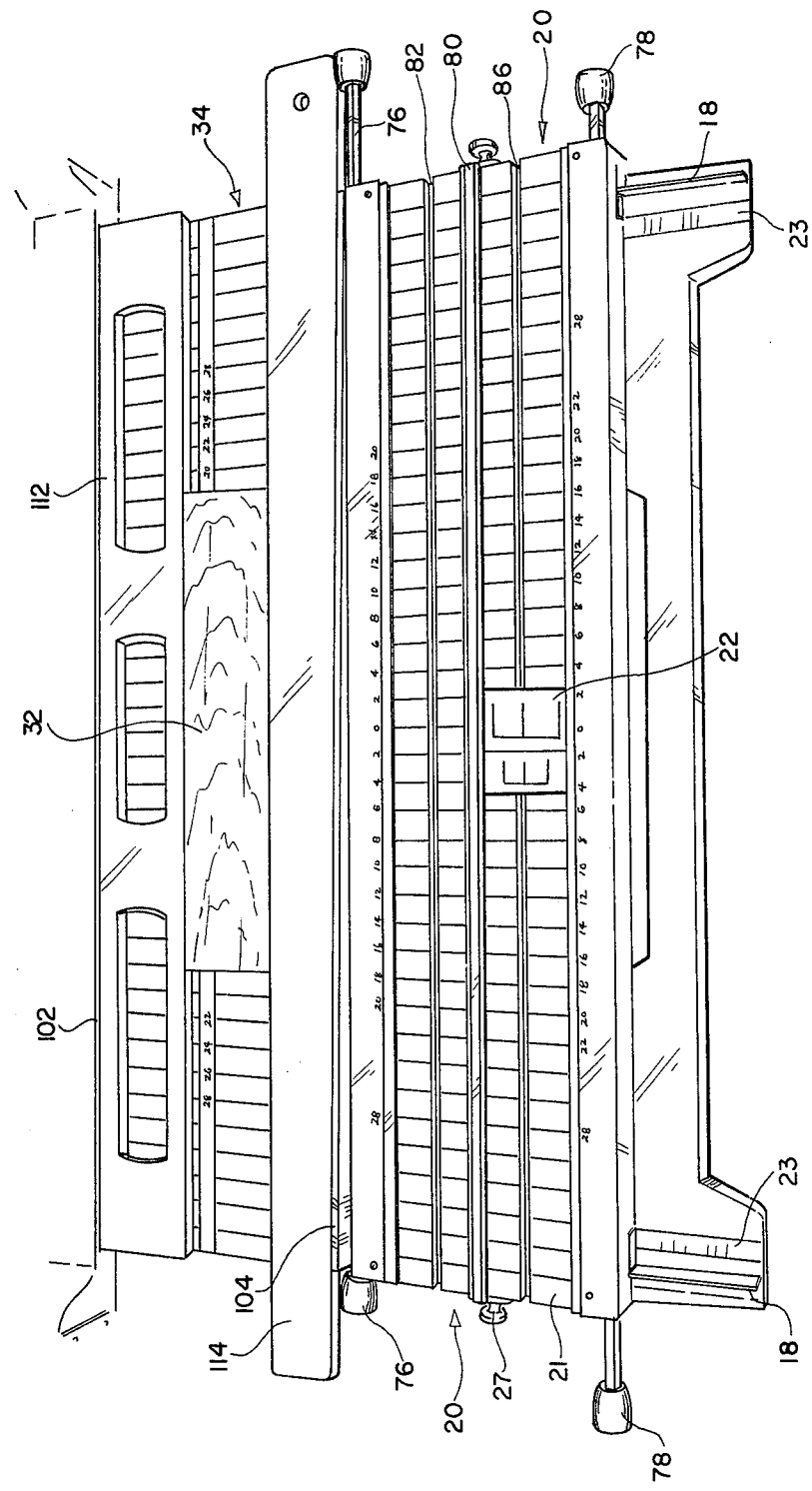
FIG. 3 is a perspective view of the guide letter holder with divider bar in place, and guide letters in the bottom track, as well as of the workpiece holder with a workpiece held in place by the use of both spacer and wedge.

As best seen in FIGS. 3 and 4, the guide letter holder assembly 20 is essentially parallel to the elongate workpiece holder assembly 34, and maintains such parallel relation as its position along the parallel tracks 18 is adjusted on occasion. Although flanged rollers may be used on the underside of the assembly 20, these are usually not necessary, and inasmuch as movements of this assembly are to be neither rapid nor extensive, I may utilize slotted portions along the undersides of te respective ends of the guide letter holder assembly 20 to engage the tracks. In one embodiment of my invention, the tracks 18 were approximately 26 inches above the ground, and were each 14½ inches long, with the two tracks being 38½ inches apart. The guide letter holder assembly 20 in that embodiment had a dimension of 9¾ inches in the fore and aft direction and was 40 inches wide in the left-right sense. As a result of this arrangement, the guide letter holder assembly 20 in accordance with this preferred embodiment is selectively adjustable for distances up to approximately 4 to 5 inches with respect to the workpiece holder assembly. Locking means 27 is provided on each side of the assembly 20 to enable it to be secured in the desired position on the tracks 18.

A graduated scale 23 is preferably used on the upper surface of the member 16 adjacent each track 18 so that by the use of a previously calculated book of tables, any necessary adjustments of the assembly 20 with respect to the workpiece 32 (and table 12) can be rapidly made during the creation of a custom-made sign that uses either a single row of letters, or multiple rows. The arrangement of scales is to be seen in FIGS. 3 and 5, with scale details being visible in FIG. 4c.

The book of tables I use to indicate the proper positioning of the guide letter holder in relation to the workpiece, is a particularly helpful innovation. One of the most time-consuming and error-prone aspects of sign making is the layout of the lines of lettering in relation to each other, and in relation to the edges of the workpiece. This is particularly true when making a four or five line sign on one piece of wood, as this machine is easily capable of doing.

The book of tables enables the operator to immediately determine the correct position of the guide letter holder over the scale, and also in which position the guide letters should be placed, so that one line or multiple lines of lettering will appear in the correct position, on a variety of standard lumber sizes, without the operator finding it necessary to compute or measure to achieve proper layout.

The book of tables I use for each machine displays in excess of 50 arrangements of lines of lettering of a variety of letter sizes and combination of sizes, and an apprentice type person, unskilled in sign making, can quickly achieve professional results with minimum training in sign layout.

To simplify the centering of the guide letters on the upper surface 21 of the guide letter holder assembly, I provide a centerline running in the fore and aft direction, identified by the zero. As will be noted from FIG. 4, I also provide the numbers 2, 4, 6, 8 etc. spaced one inch apart, disposed in each direction away from the centerline position. Thus, the numbers on surface 21 in FIG. 4 appear in the sequence 10, 8, 6, 4, 2, 0, 2, 4, 6, 8 and 10. A similar arrangement is used on the upper surface of the workpiece holder assembly 34, as FIG. 4 also reveals, this facilitating the centering of the workpiece 32 thereon; note FIG. 3. It is to be noted that the centerlines of the assemblies 20 and 34 are in alignment at all times, this assuring that when the centered array of guide letters has been traced by the tip of the stylus 25, the router bit 28 will cut letters that are properly centered on the workpiece 32. The arrangement for securing each workpiece on the workpiece holder assembly will be described hereinafter.

The router assembly 26, as previously mentioned, involves a carriage or bearing housing 36 that is slidable in a left-right sense on the bar 40, and rotatable about the bar at such times as the stylus is lifted. Slidably disposed in the member 36 are a pair of parallel rods 50. Since the router motor assembly has tangible weight, I minimize the strain on the operator by providing in accordance with this invention, and as shown in FIGS. 2 and 7, a long tension spring 38 whose lower end is attached to the router assembly 26, and whose upper end is attached to a superstructure 39 provided above the table number 12. I have found that this arrangement is far superior to the conventional arrangement that entirely relies upon a counterbalance weight arrangement. This is because a counterbalance weight, mounted on the parallel rods 50 would, of necessity, be constantly changing in distance from bar 40 as a sign was being routed, with bar 40 in this instance acting as a fulcrum. Thus, as the router mounting assembly is moved rearwardly toward bar 40, the moment arm of the counterbalance weight is lengthened, and the weight of the stylus is greatly diminished. Understandably, the reverse is true when the router mounting assembly is moved toward the operator, causing the weight on the stylus to be greatly increased.

The wide variation in weight on the stylus can be very annoying to the operator, and can also lead to mis-cuts in the workpiece. The use of the counterbalance tension spring 38 in accordance with this invention provides a much more even loading on the stylus, and a more even "feel" to the machine. Obviously other forms of spring bias could be used within the spirit of this invention, and I am not to be limited to a tension spring arrangement.

A second, and equally important advantage of using a spring as an important adjunct to the balance arrangement is that a substantial saving in weight of the moving parts is effected, thus reducing inertia forces encountered during start and stop, and during direction changes that take place during the routing of a letter.

Guide Letter Holder Assembly

The guide letter holder assembly 20 in the illustrated embodiment may, as previously mentioned, extend for approximately 40 inches in the left-right sense, and for approximately 9¾ inches in the fore and aft sense. The upper portion of the elongate assembly 20 defines a planar working surface 21 that extends for the full width of the device, and for approximately 6¾ inches in the fore and aft sense, and on this planar surface, a number of selected guide letters can be received and secured.

Figure 5:
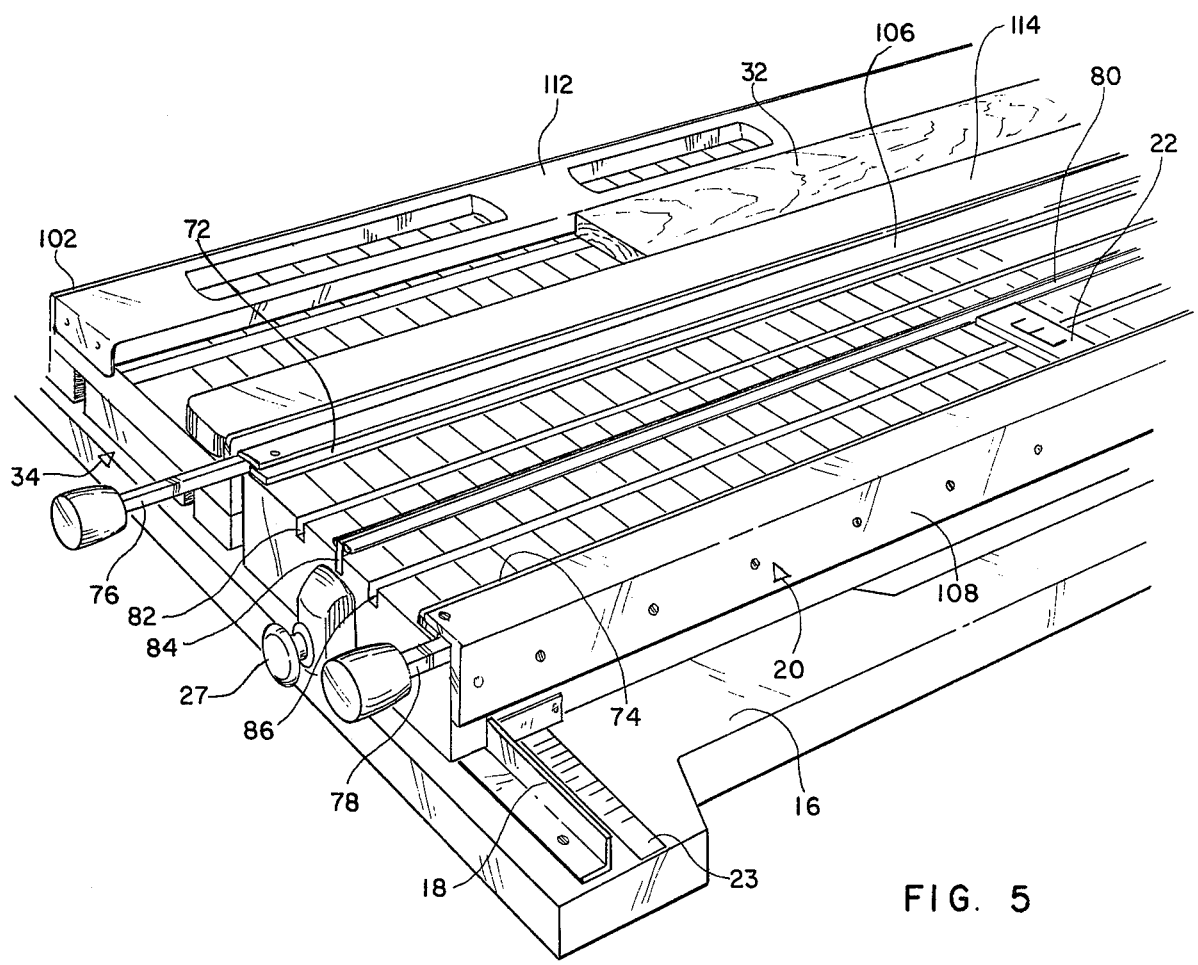
FIG. 5 is a perspective view of the guide letter holder and workpiece holder, taken from one end in order to reveal the slots in the surface of the guide letter holder, into any one of which the divider bar can be installed.

Disposed along the forward upper edge and the rearward upper edge of the assembly 20, as best seen in FIG. 5, are rapidly operated locking or securing means, enabling guide letters of uniform size to be accommodated and secured without the employment of tools of any kind. These locking means take the form of rear and front parallel strips 72 and 74, referred to herein as guide letter contacting members, that are separately movable in such a way as to remain parallel at all times with the front and rear of the assembly 20. As shown in FIGS. 3–5, means are provided for mounting a pair of locking bars 76 and 78, each approximately 46 inches long, along the upper forward and upper rearward parts of the assembly 20, with each of these bars for example being of square cross section 5/16 inch on a side, and independently slidable in a left-right sense. When the bars 76 and 78 have been moved to the right, their respective movable strips 72 and 74 separate as far apart as they will go, with this distance being approximately 6¾ inches. If one or more guide letters of that size or slightly smaller are placed on the upper surface 21 of the assembly 20, and the guide rods are moved firmly to the left, in accordance with a wedging action to be described in conjunction with FIG. 6, the guide letters are caused to be gripped tightly, and thus be prevented from slipping during the time they are being engaged by the stylus.

The slidable bar 76 is held in operative position on the upper rear portion of assembly 20 by means of a metal corner member 106, and the slidable bar 78 is held in the operative position on the front of the assembly 20 by means of a metal corner member 108. In each instance, a number of holes are provided in spaced locations along the vertical portions of the corner members, to permit the entry of the screws that are used for fastening the corner members to the base portion of the assembly 20.

Figure 6:
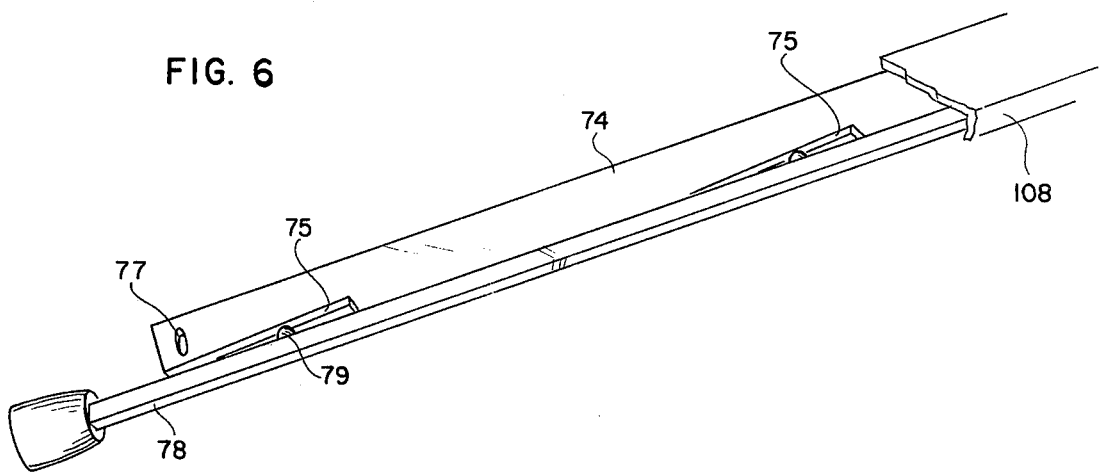
FIG. 6 is a fragmentary view of the principal position of one of the mechanisms utilized on the guide letter holder for enabling the operator to rapidly secure the selected guide letters in position.

Referring to FIG. 6, it is to be seen that the side of the member 78 facing the guide letters is equipped with a plurality of spaced protuberances 79, whereas the side of the strip 74 that faces away from the guide letters is cut to form a plurality of notches 75, with these notches being spaced identically to the spacing of the protuberances 79. An elongate hole or slot 77 in the strip 74 is arranged to receive a securing screw (not shown) that serves to prevent undesired longitudinal movements of the strip with respect to the planar surface 21.

It will be noted from FIG. 6 that the notches 75 each have a long sloping portion, so as the bar 78 is moved by the operator to the left as viewed in FIG. 6, the strip 74 is necessarily forced away from the bar 78, for longitudinal movements of the strip are prevented by the aforementioned securing screws. Thus, the strip 74 is caused to move against the adjacent edges of the guide letters, and thereby bring about a secure holding of the guide letters in the desired position. The same protuberance and notch arrangement is also used for bar 76 and strip 72, such that movement of the bar 76 to the left causes the strip 72 to move away from the bar, and in the direction toward the strip 74.

Often, I do not work with letters of this large size, and accordingly I provide one or more dividers 80 that serve as a means for separating or dividing the planar surface 21 into a top track (TT) and a bottom track (BT). I usually provide three parallel slots, such as slots 82, 84 and 86, which extend in a left-right sense across the surface 21, as perhaps best seen in FIG. 5. In a selected one of these slots, a divider bar 80 can be tightly fitted. When the divider bar is in the center slot 84, as illustrated in FIG. 5, this divides the working surface of the assembly 20 into the aforementioned top track and bottom track, each approximately 3⅛ inches wide, extending from left to right for the full extent of the assembly. By placing guide letters prepared upon 3-inch blocks in either of these tracks, with one edge of each letter contacting the divider means, the letters can be clamped and held against undesirable movement by manipulation of the appropriate locking bar 76 or 78. This arrangement of course enables various sizes of letters created on blocks measuring 3 inches in the fore and aft direction to be installed in the bottom or near track, and an entirely different array of letters created on 3-inch blocks to be installed in the top track, which is the track nearer the workpiece holder assembly 34. Inasmuch as a 3-inch letter created in a workpiece is made from a letter slightly smaller than that, a 3-inch guide letter can obviously be accommodated on a 3-inch block. Slippage is prevented by utilizing cushion material on both sides of the divider bar 80, in positions contacted by the guide letters. Note FIG. 4a, wherein the construction of a typical divider bar 80 is set forth.

Workpiece Holder Assembly

As best seen in FIGS. 2 through 5, the workpiece holder assembly 34 is designed to have an upper planar surface 35, upon which the workpiece to be routed is firmly yet removably held during the routing operation, this being accomplished in such a way as to avoid slippage. I perhaps could use a rapidly operating locking arrangement generally along the lines of that used on the guide letter holder assembly 20, but because of the wide range of workpiece sizes I normally work with, I have found it more expeditious to use long tapered wedges, preferably of hard wood, in order to be able to rapidly secure each selected workpiece in the desired operating position on the surface 35. To permit each workpiece 32 to be secured in the desired centered position by the use of wedges, I provide shoulder members 102 and 104 on the workpiece holder assembly, extending in a left-right manner, which shoulder members are of sufficient height as to extend above the planar surface 35 for approximately 3/4 of an inch, as perhaps best seen in FIGS. 2, 5 and 9. Appropriately sized holes are disposed at spaced locations along the lengths of the shoulder members, thus to permit the use of screws in securely fastening these members to the assembly 34.

Though the scale of the figures of drawing do not clearly reveal same, it is to be noted that the spacing between the shoulders 102 and 104 is greater at the right-hand end of the device 34 by approximately ½ inch, than is the spacing at the left end. For example, the distance between the shoulders at the right-hand end can be 10¾ inches, and at the left-hand end 10¼ inches. This is another way of saying that when the assembly 20 has been moved along its rails 18 into a position in which its right-hand end is contiguous to the assembly 34, there is approximately a ½-inch gap between the left end of shoulder 104 and the near edge of the metal corner member 106 of the assembly 20. Note FIG. 4. This is true because while the rear shoulder 102 is at all points equidistant from the guide letter holder assembly 20, the front shoulder 104 angles away from the guide letter holder assembly in such a way as to cause the left portion of the planar surface 35 to be less wide than the right portion.

A a result of this arrangement, it is but a simple matter to secure a selected workpiece in the desired centered (or offset) position on the workpiece holder assembly merely by inserting a long tapered wedge 114 between the near edge of the workpiece, and the shoulder 104. Advantageously, I cut the wedge 114 to have the same angularity as is involved in the positioning of the shoulder 104 on the workpiece holder assembly, which of course means that the edge of the wedge nearest the workpiece is parallel to the shoulder 102. When the wedge is pushed toward the left, this causes the workpiece to be forced firmly against either the rear shoulder 102 in the event a wide workpiece is being utilized, or else against a spacer 112 (see FIGS. 3 and 5) that in turn is in contact with the shoulder 102. It is to be understood that spacers of the appropriate sizes are utilized when comparatively narrow workpieces, such as of 4- and 6-inch widths are being utilized, but are not used with wider workpieces. A variety of spacer members and wedge members are customarily stocked by the operator, so that during a working day he can secure any of a wide range of workpiece sizes in the centered position on the workpiece holder assembly.

It is to be understood that in referring to workpieces by their finished widths, I am of course referring to their dimension in the fore-and-aft direction of movement of the router assembly. Actual widths of finished lumber is of course somewhat less than their nominal widths. Some examples of the way I secure workpieces of standard (finished) widths in the workpiece holder are as follows:

| Stock to be Secured | Components Used |
|---|---|
| 4 Inch Width | Large wedge and large spacer |
| 6 Inch Width | Large wedge and small spacer |
| 8 Inch Width | Large wedge alone |
| 10 Inch Width | Small wedge alone |

Referring to FIG. 9, it is to be seen that the rear shoulder 102 and the front shoulder 104 of the workpiece holder assembly are revealed in greater detail, as is the spacer 112. Suitable members 112a may be utilized at each end of the spacer in order to serve to hold it against slippage on the workpiece holder assembly.

The figure also reveals a pair of spaced, upstanding pins 120 that are arranged to mate with spaced holes (not shown) on the underside of the workpiece holder assembly 34, thus to prevent slippage. The holes are of sufficient depth as to permit the workpiece assembly to rest directly on the upper surface 16 of the table 12, such being the case when workpieces of considerable thickness are being worked with. For example, from time to time I rout signs out of 2 × 6, 2 × 8 and 2 × 10 material. However, when the workpieces are of nominally 1 inch material, it is desirable for the effective plane of the workpiece holder assembly to be raised, in which event I move the hinged shim member 122 and its counterpart on the other side of the machine into place on the surface 16. These shims are of $\frac{3}{4}$-inch material, so are of the proper thickness to be used when a workpiece of nominal 1-inch material is being worked. As another feature of my device, I can hinge a second set of say $\frac{1}{2}$-inch height shims oppositely to the shim members 122, thus to give added versatility to my machine.

It is to be noted that the upper working surface 35 of the workpiece holder is provided with numbers spaced one inch apart, but with only even numbers being used. These numbers extend in both directions from the zero mark so as to enable, as in the case of the guide letter holding device, the rapid centering of an item being placed thereon. See FIG. 4. A workpiece two feet long could therefore be quickly centered upon the operator realizing that the number 24 appears at the left end as well as at the right end of the workpiece.

This arrangement greatly facilitates the centering of the workpiece being used with a given set of guide letters, for after the chosen guide letters have been centered on the guide letter holder, the workpiece will be centered automatically with respect to the guide letters upon it being centered on the planar work surface 35, due of course to the fact that the guide letter holder assembly and the workpiece holder assembly are inherently centered with respect to each other; note the alignment of the centerlines of the two holder assemblies as revealed in FIG. 4.

This arrangement does not in any manner preclude the cutting of work pieces of a length much greater than that of the workpiece holder. For example, after a portion of a long workpiece has been routed in the desired manner, the wedge is loosened and the workpiece moved to the next position. The operator then proceeds to route the next letter portions, and so on down the length of the workpiece. I often use a saw horse or other type of support for the ends of a workpiece that is particularly long.

Description of Router Assembly

The router assembly 26 in accordance with my invention involves a carriage or bearing housing 36 that is slidably mounted, as previously mentioned, upon the bar 40 of circular cross section that extends across the back of the machine; note FIGS. 1, 4 and 7. The bar 40 is preferably of steel that has been case hardened to Rockwell 58–62, and ground, and is of say 1 inch diameter in order to support without undue flexing, the base member 36 and the members carried thereby.

The bar 40 is supported in a manner essentially parallel to the guide letter holder assembly 20 and the workpiece holder assembly 34 by the use of spaced upstanding members 42 and 44 at the rear of the machine. The bar is usually mounted 3 or 4 inches above the working surfaces of the assemblies 20 and 34, and is typically 50 inches long, which is of course some 10 inches longer than the left-right dimension of either of the aforementioned assemblies. In this way, the stylus 25 can be moved to either end of the assembly 20 before the near end of the carriage 36 comes into contact with a member 42 or 44.

An aperture 46 is disposed through the carriage 36 in a left-right sense, in which aperture the bar 40 is received, with linear ball bearings being provided in such aperture as to make longitudinal carriage movements by the operator along the bar 40 comparatively effortless. The carriage can also rotate with respect to the bar.

Disposed in the carriage 36 transversely to the aperture 46 and the bar 40 are a pair of apertures 48, spaced for example 8 inches apart. These apertures are an inch or two below the aperture 46, and in these apertures 48, the aforementioned parallel rods 50 are slidably disposed. The rods 50 typically extend for something over 2 feet in the fore-aft direction, and their movement in the carriage member 36 involves a minimum amount of friction as a result of the use of linear ball bearings in the apertures 48.

Mounted upon the front end of the rods 50 is a support assembly, involving for example a pair of structural members 54 and 55, such as of aluminum; see FIGS. 2 and 4. Each of these latter members extends for say $9\frac{1}{2}$ inches in a left-right sense, with a horizontal hole being provided near each end of each member 54 and 55 to permit insertion of the rods 50 for the support of these structural members. A single structural member 57 is provided across the rearmost portions of the rods 50, with these several members thus assuring that the rods are kept in parallel relation at all times, and also preventing the rods from pulling out of the desired operating relationship to the carriage member 36. A set screw may be threaded into each end of each of the members 54, 55 and 57 so as to enable each of these members to be locked in the desired relationship to the rods 50.

Extending forwardly from member 55 in a transverse manner is a member 56, parallel to the rods 50, with the member 56 serving as a mounting means for the adjustable stylus assembly 25; see FIGS. 2 and 8. By the operator moving the stylus in a left-right sense as well as in a fore and aft sense as required, the guide letters can be accurately traced, and the router bit 28 caused to act upon the workpiece 32 in a desirable fashion. I may use any of a variety of router bits, but I usually prefer to use a V-grooving bit that I modify by flattening the point. As a result, the finished letters in the workpiece are anywhere from $\frac{1}{8}$ inch larger to a full inch larger than the corresponding guide letters.

A typical stylus tip-router bit distance is 11¾ inches, but I of course am not to be limited to the spacing of these components. The spacing is normally fixed, but in some embodiments of my invention mentioned hereinafter, the spacing between the stylus and the router bit can be adjusted at the behest of the operator.

The longitudinal centers of the parallel members 54 and 55 may be say 4 or 5 inches apart, with a plate 58 riveted or otherwise secured on the underside of these members, thus to form a support for the router. The plate 58, shown in FIG. 4b, is of material of sufficient thickness to form a sturdy support for the router, and is provided with three holes, through the center one of which, the output shaft of the router can extend downwardly. Plate 58 is in addition to stabilizing plate 59, which may extend between the rods 50, and be secured between members 55 and 57 to add desirable stiffness in the left-right direction.

It is to be realized that the router motor as supplied by certain manufacturers is equipped with a base member 31 in which the router motor is slidably disposed. The motor in effect rests on the upper edge of the router base member. This upper edge is of helical construction (see FIG. 1), such that rotational movements of the router motor with respect to the base brings about desired height changes of the rotor output shaft. Obviously I am not to be limited to this type of router height changing device, for a rack and pinion, thumb gear, or any other well known height changing arrangement can be effectively used in accordance with this invention. The depth of cut adjustment is of importance particularly in the event a V-grooving bit is being used, for depth of cut controls the width of the letter stroke.

On the lower end of the router output shaft is of course to be mounted a router bit 28 of a size and configuration appropriate for the cutting of letters in the workpiece 32 selected in a given instance. The two outside holes are provided in the plate 58 in order for the sawdust evolved as the router bit cuts into the workpiece, to be drawn into the ducts 62 by action of a vacuum system I use. The ducts 62 connect to a common duct 64, which in turn connects to a vertically disposed duct 66, upon the upper end of which a flexible hose 68 associated with the vacuum system can be utilized. A short horizontal member 70, disposed on the rear side of the vertical duct 66 forms the attachment means for the lower end of the tension spring 38 that is to be used in accordance with this invention to relieve the operator of the substantial amount of strain that would otherwise be involved if the operator had to carry a substantial portion of the weight of the assembly during his manipulation of the stylus. As previously mentioned, I prefer a bias arrangement using the spring 38 to an ordinary counterbalance arrangement in view of the much less inertia that is involved, and the uniformity of the assistance the operator is given.

Router Assembly Balance Arrangement

Reference to FIGS. 1 and 2 reveals that the router assembly is supported at the forward end of the pair of slidable bars 50, which bars are necessarily of considerable length in order that the router assembly, and more particularly the stylus 25 and the cutter bit 28, can be moved for substantial distances in the fore and aft direction by the operator, such as when he is concerned with cutting a multiplicity of lines in a sizeable workpiece. It has already been explained that when creating a multi-line sign, it is frequently necessary for the operator to adjust the position of the guide letter holder assembly 20 in the fore or aft direction along the tracks 18. Particularly when the assembly 20 has been adjusted toward the user, it is necessary in many instances for the operator to pull the router assembly for a substantial distance away from the guide bar 40, and thus cause the structural member 57 at the rear end of the rods 50 to move quite close to the rear side of the carriage 36. As a result, were it not for the operation of the tension spring 38, there would be a large router assembly weight for the operator to sustain.

As previously explained, in accordance with my novel design, I obviate the problems associated with change of position of counterweights by the use of the tension spring 38, which is perhaps best seen in FIG. 7, with the lower end of the spring affixed to the short horizontal member 70, and the upper end supported by a hook or bolt 132. The member 132 is affixed in the lower end of a plate 133, at the upper end of which plate a roller assembly 134 is received. The roller is arranged to run along a track 136 that is mounted on cross member 138 several feet above, but substantially parallel to, the bar 40.

As is obvious, in cutting workpieces of substantial dimension in the left-right sense, it is necessary for the router assembly to be moved for considerable distances along the bar 40, and this fact makes it impossible for a spring of finite length to function properly from a single fixed upper suspension point. It is for this reason that I utilize the roller and track arrangement for supporting the upper end of the spring 38, so that the upper end of the spring can essentially move with the carriage 36 as it is caused to move along the bar 40. The bolt 132 also serves as an upper support for the chain 128 that is utilized for holding the electric cord 130 associated with the router motor 30 in an out-of-the-way position at all times.

Preferably the lower end of the spring is attached approximately 4¾ inches aft of the center of the router motor. Thus, as the router assembly is pulled toward the user, the spring is caused to elongate and thereby to assert a stronger upward pull that tends to counterbalance the weight of the router device 30, for at this time the member 57 is closer to the carriage 36 and to the bar 40, and thereby less effective as a counterweight. On the other hand, as the router assembly is moved away from the user and toward the bar 40, the member 57 becomes more effective as a counterweight, but this factor of course is balanced by the fact that there is less elongation of the tension spring, and its upward pull becomes less.

As a matter of fact, because the affixation point of the spring is behind the router motor on the member 70, it actually passes over the location of the bar 40 when the router assembly has been moved aft as far as possible, and in this particular instance, the spring serves to produce a slightly downward force at the stylus.

I have found that by this construction making prominent use of the spring 38, I have provided a highly effective arrangement for minimizing the force changes taking place at the stylus, thus vastly reducing the efforts on the part of the operator. Rather than endeavoring to arrive at and maintain a perfect balance, I typically utilize a spring tension such that when the operator has removed his hand from the stylus, the stylus is suspended approximately one inch above the guide letters. When the stylus is in that position, the router cutting bit is suspended above the workpiece. This latter fact is highly advantageous in that should the operator release the stylus before the router bit stops turning, damage to the workpiece by the bit can be avoided. Likewise, the workpiece is protected should someone inadvertently turn on the router.

I have previously mentioned that my entire device can be assembled and dis-assembled without the use of tools, with the superstructure portion 39 being no exception. Advantageously, I design the member 42 to receive the lower end of vertical member 142 of the superstructure, and the member 44 to receive the lower end of vertical member 144. Preferably I use a form of wedging action in order to assure a tight fit. The upper ends of members 142 and 144 are notched, as shown in FIG. 1, so as to tightly receive the ends of the cross member 138, and thus form an adequate support therefor.

Several of the important relationships between the router motor mounting assembly, and the assemblies 20 and 34 are to be noted. For example, when the stylus tip 24 is following the indentations of the guide letters, the router bit 28 is engaging the workpiece 32, and the rods 50 are to be parallel to the workpiece. Otherwise, if the rods were not horizontal, letters of varying depth would be formed in the workpiece. To that end, I provide for a stylus assembly 25 of the type shown in FIG. 8, wherein an outer, threaded portion 92 engages threads (not shown) in the end of the stylus mounting means 56. The member 92 is hollow, and contains a vertically movable or "floating" portion 94, of which the tip 24 forms the lowermost portion.

In use, the operator ordinarily seeks out the indentation of each next letter with the floating portion 94 in the position shown in FIG. 8, which is the position in which the cap portion 96 is firmly against the top of the threaded portion 92, and the tip 24 is as far as possible from the arm 56. After the tip is properly in the selected indentation, the operator permits the floating portion 94 to move to the position shown in FIG. 2, which is the position in which the router bit 28 is permitted to come into cutting contact with the workpiece 32. This is to say, it is not until the tip is properly in the indentation of the selected letter that cutting action can take place, and this effectively prevents undesired or premature contact between the router bit and the workpiece. The operator can at any time easily bring about rotation of the threaded portion 92 with respect to the arm 56, and thereby change the position of the tip 24 with respect to the arm 56. In this way, the operator can maintain the bars 50 parallel with respect to the workpiece at all times, and thus avoid cutting letters of uneven depth. Stylus tightening means in the form of a knurled knob 98 makes it possible to lock the adjustment in the desired position.

It is to be noted that the cuts in 1-inch guide letters are shallower than those in 4-inch letters. If the stylus assembly is adjusted to assure a uniform depth of cut with the 4-inch letters, it will be found that the same setting will cause the 1-inch lettes to be cut slightly deeper at the top. This can be avoided by turning the threaded member 92 several turns counterclockwise.

This adjustment can also be used to largely compensate for wood that is warped across its width, or "cupped", as is sometimes the case with thin, wide boards such as of 1 × 10 size. As the workpiece is not flat, the letters will cut deeper at the top or bottom unless stylus adjustment is made.

Other Embodiments of My Invention

I have now discovered an embodiment in which the guide letter holder assembly is adjustably movable with respect to the workpiece holder assembly, thereby making it possible to accurately prepare multi-line signs. However, I am not to be limited to the described arrangement, for quite obviously the workpiece holder assembly rather than the guide letter holder assembly could be movable in a fore and aft sense. In such instance, I would undoubtedly utilize tracks comparable to tracks 18 for supporting the workpiece holder assembly, and I would utilize an arrangement in order that workpieces of different thicknesses could be accommodated.

Still another embodiment of my invention could involve the use of guide letter holder assembly and the workpiece holder assembly that are disposed in fixed, parallel relation to each other. Inasmuch as this would greatly restrict the versatility of my machine, I could at this point utilize an arrangement wherein the stylus tip and the router cutter bit, instead of being in an essentially fixed relationship to each other, could be adjustably and selectively movable. An arrangement easily permitting this would involve the utilization of an arm 56 having telescopic sections, with a screw 61 or the like being utilized for securing the sections in a rigid, selected position with respect to each other. Thus, in order to prepare a multiline sign with the assemblies 20 and 34 in fixed relationship, the operator would loosen the screw 61 and move the telesopic sections with respect to each other as may be necessary, with, however, the stylus tip and cutter bit being in an unchanging relationship with respect to each other during the time that any one line of the sign is being cut.

Positioning Guide Letter Holder by Use of Book of Tables

It is obvious that my novel engraving machine can work with a wide variety of workpieces, whether considered from the width, length or thickness standpoint. Although I have principally discussed workpieces of standard width, such as 4-inch, 6-inch, 8-inch or 10-inch widths of finished lumber, by proper selection of the wedges and spacers used, I can of course mount and operate upon workpiecs of all intermediate sizes.

When working with standard size workpieces, I have found that a great deal of layout and measurement time can be saved by utilizing previously performed calculations, such as a book of tables derived empirically. Such tables set forth from the standpoint of workpiece sizes, the guide letter holder position with respect to the workpiece holder such that a single line sign may be created out of letters of a desired size, or else a multiline sign made in which the several lines are attractively placed on the workpiece, with the spacing being centered if such be desired, or else desirably offset.

It is to be noted that other routing machines and other engraving machines have been enabled to work with workpieces of various sizes, but as pointed out hereinbefore, a great deal of time is consumed in securing the guide letters and the workpiece in correct positions, and a great deal of additional time is consumed in calculating and laying out the signs so that the letters of the sign will be properly and attractively disposed thereon. With the prior art machines, it is possible that some degree of rapid production rate could be achieved if workpieces of a single standard size are being dealt with, but should the operator endeavor to work with workpieces of intermixed sizes, he will consume a vast amount of time in a prior art machine, in calculating the layout arrangements.

In contrast with the foregoing, my novel machine not only enables the operator to quickly secure the guide letters and the workpiece in proper, centered positions in their respective holders, but also, because of the carefully engineered relationship between the workpiece holder and the guide letter holder, it is possible to rapidly produce a sign from a workpiece whose size is significantly different from the size of the workpiece previously in the machine. This is because it is easily possible to create for each machine constructed in accordance with my invention, a book of tables or calculations that immediately tell the operator for each size workpiece, exactly how to place the movable holder (in this instance the guide letter holder) with respect to the fixed holder. As long as the stylus to router distance is not changed away from the setting for which the tables were calculated, or any other change of significance made, it is but a simple matter for the operator to quickly set up the machine for each next size workpiece he encounters, and then proceed to place any of several different letter sizes and any of several different multi-line arrangements on the workpiece in a most attractive and eye-pleasing manner, without any measurements or calculations being necessary.

The preferred embodiment of my machine, as previously indicated, involves an arrangement in which the guide letter holder is relatively movable with respect to the workpiece holder, while at all times being disposed in a parallel relationship therewith, and with its centerline in alignment with the centerline of the workpiece holder. A scale, such as the scale 23, is utilized so that the operator can place the two holders at the precise spacing desired. Because of this novel arrangement of components and the novel concept associated therewith, it is possible to easily arrive at a relationship of these components that can be duplicated at such time as a sign resembling a previously prepared sign is to be created, utilizing an entirely different, but standard size, workpiece. In other words, for the first time, a non-complex, low cost routing machine arrangement has been provided, by the use of which repeatable results are obtainable. Therefore, instead of the operator having to perform a number of calculations and accomplish a layout each time another sign is to be created, it is possible in accordance with this invention to be able to refer to a book of tables calculated for a number of standard wood sizes. Within each wood size, it is then possible to arrive at a number of different combinations of sizes of letters and number of lines of letters, and then choose for the particular sign wanted, the proper, empirically derived setting for the guide letter holder.

For example, when working with standard four inch lumber, it is of course apparent that not too many rows of letters can be placed thereon because of the comparatively short fore-aft distance available with lumber of this size.

Accordingly, my table pertaining to 4-inch lumber calls out only four possibilities, namely, a single row of 1-inch letters; two rows of 1-inch letters; one row of 2-inch letters; and one row of 3-inch letters.

My table for use with 4-inch lumber thus appears as follows:

| Letter Size | Setting of Guide Letter Holder Assembly | Track in which Guide Letters To be placed |
|---|---|---|
| 1" | aa½ | TT |
| 1" | ee | TT |
| 1" | U½ | BT |
| 2" | T½ | BT |
| 3" | S | BT |

In the foregoing table, if the operator is going to create only a single row of 1-inch letters, he moves the guide letter holder to the aa½ reading on scale 23 and then places the divider bar in the correct slot, which in this instance is the top slot 82, thus to create a top track of the correct size for the letters involved. On the other hand, when on the same size lumber he is to create a two line sign, the operator places the guide letter holder at position ee when creating the top line, and then moves the guide letter holder to position U½ for the second line. In this latter instance, the operator uses the top track for the first line and the bottom track for the second line, with either two divider bars being used, or else a single bar being moved from the top slot to the bottom slot after the first line of the sign has been cut out.

My book of tables reveals the following information with regard to 6-inch lumber;

| Letter Size | Setting of Guide Letter Holder Assembly | Track in which Guide letters To be placed |
|---|---|---|
| 1" | K½ | TT |
| 1" | A½ | TT |
| 1" | V | BT |
| 1" | G | TT |
| 1" | aa | TT |
| 1" | I½ | TT |
| 2" | T½ | BT |
| 2" | F | TT |
| 2" | L | TT |
| 1" | V | BT |
| 3" | F | TT |

When working with standard 8-inch lumber, the book of tables reveals a larger number of possible combinations.

| Letter Size | Setting of Guide Letter Holder Assembly | Track in Which Guide Letters to Be Placed | Letter Size | Setting of Guide Letter Holder Assembly | Track in Which Guide Letters to Be Placed |
|---|---|---|---|---|---|
| 1" | U | TT | 1" | U | TT |
| 1" | K | TT | 2" | J½ | TT |
| 1" | B | TT | 1" | V | BT |
| 1" | V | BT | | | |
| 1" | R½ | TT | 2" | V | TT |
| 1" | G | TT | 1" | B½ | TT |
| 1" | aa | TT | 1" | V | BT |
| 1" | U | TT | 1" | R | TT |
| 1" | D½ | TT | 3" | B | TT |
| 2" | V | BT | | | |
| 3" | K½ | TT | 2" | V | TT |
| | | | 3" | V | BT |
| 3" | R | TT | 3" | T | TT |
| 1" | aa | TT | 2" | T | BT |
| 4½ | P | TT | | | |

My tables for use in connection with 10-inch lumber reveal that I can easily create a properly spaced 5 line sign, or any of eight different combinations of four line signs, or any of nine different three line signs, or ten different two line signs. Of course, a single line sign could be made of any letter size, but typically 4-inch guide letters or larger would be used.

Examples of the Routing of Specific Signs

From the foregoing it should be generally clear how my invention is used, but it might nevertheless be helpful if I described in some detail, some specific examples. Consider first the following sign to be routed:

The Russells

3030 Magnolia Ave.

Wood chosen for this sign is 1 × 8 stock, standard lumber size, length to be appropriate for the length of the lettering. Letter size, top line, 3-inch block letters except the "The", which is to be in script. Bottom line to be in 2-inch block letters.

Step 1

The book of tables associated with the specific machine at hand is opened to the section displaying the various lettering arrangements that can be accomplished on 8-inch stock. In the book of tables at this location will be found a grouping of figures as follows:

| Letter Size | Setting of Guide Letter Holder Assembly | Track in which Guide Letters To be placed |
| --- | --- | --- |
| 3" | T | TT |
| 2" | T | BT |

Step 2

The 3-inch guide letters are now placed in the top track of the guide letter holder assembly, and the 2-inch letters are placed in the bottom track. It is to be noted that the 3-inch letters as well as the 2-inch letters are created on the same size blocks. Actually, these letters ar physically somewhat smaller than these sizes, but when the bit dimensions are taken into consideration, the resulting letters cut into the workpiece are in fact 3 inches and 2 inches. In view of the fact that the letters are of the same size, the divider bar 80 must be disposed in the center slot 84. The guide letters in this instance cannot be inserted unless the bar 80 is in the proper slot of the guide letter holder assembly so it is unnecessary in the book of tables to specify the slot.

Step 3

The guide letters in each track are slid to the left or to the right as may be necessary until the group is centered, this latter being determined by the centering guide numbers on the planar surface of the guide letter holder. See FIG. 4. The locking bar 76 is then slid to the left to lock the guide letters of the upper track, and the locking bar 78 slid to the left to lock the smaller letters in the bottom track.

Step 4

The friction locking knobs 27 at either end of the guide letter holder assembly ar loosened, and the guide letter holder assembly is moved until the letter "T" on the scale 23 appears even with the lower edge of the holder assembly on each side. The friction knobs are now tightened.

Step 5

In centering the two lines of lettering, it was seen that the bottom line was the longest, extending to the 26 marks on each side of the centerline of the guide letter holder. This indicated that the routed letters for the longest line will be 26 inches long. This readily indicates that the workpiece must be at least 28 inches long to accommodate the lettering.

Step 6

A workpiece 30 inches long is decided upon, in order to allow for a desired border, and is placed in the workpiece holder and secured with the large wedge after centering. I call the large wedge an 8-inch wedge inasmuch as it is used with standard 8-inch lumber, not because any dimension of the wedge measures 8 inches.

Step 7

The router is adjusted for the depth of cut desired for the top line, this being accomplished in accordance with this embodiment by twisting the router motor with respect to the helical track incorporated as a part of the router base. In the event a V-grooving bit is being utilized, this adjustment controls the width of the letter stroke. The top line is then routed.

Step 8

Prior to routing the bottom line of the sign, it is desirable to adjust the depth of cut in the depth decreasing direction, inasmuch as 2-inch letters require a narrower stroke than do 3-inch letters. The bottom line is then routed.

Step 9

The sign is removed from the machine and finished in the desired manner.

It should be noted that, for this particular sign, it was not necessary to re-position the guide letter holder assembly along the tracks 18 after cutting the top line, as the Index Letter "T" is used for both lines, as indicated by the book of tables.

Consider now a second sign to be routed:

M. L. Belyea

The wood chosen is of 1 × 4 stock of appropriate length, with the letter size being 1 inch.

Step 1

The book of tables associated with the specific machine at hand is now opened to the section displaying the various lettering arrangements that can be accomplished on 4-inch stock.

| Letter Size | Setting of Guide Letter Holder Assembly | Track in which Guide Letters To be placed |
| --- | --- | --- |
| 1" | aa½ | TT |

Step 2

Guide letters are now placed in the top track TT. It is important to note that in order to form a top track for the 1-inch letters, it is necessary to place the divider bar 80 in the top slot 82.

Step 3

The letters ar now centered in the top track, and locked in place by sliding the locking bar 76 to the left.

Step 4

The guide letter holder assembly is now slid along the tracks 18 until such time as it is over the aa½ on the scale 23, with the assembly beng locked in place by means of the locking devices 27.

Step 5

In centering lettering, it was seen that the letters extended to the 9½-inch mark on the letter holder, so as a 12-inch long workpiece is indicated.

Step 6

The 4-inch spacer is placed in the workpiece holder, the workpiece is inserted nd centered, and then locked in place with the 8-inch wedge.

Step 7

Router depth of cut is adjusted, and the sign is routed.

Consider now a third sign to be routed:

Nature Trail

The letter size is to involve 4½-inch letters, and the wood size is to be 2 × 10 of appropriate length.

Step 1

Lift the workpiece holder assembly 34 and remove shim 122. The workpiece holder is then replaced on the pins 120.

Step 2

The book of tables associated with the specific machine at hand is now opened to the section displaying the various lettering arrangements that can be accomplished on 10-inch stock.

| Letter Size | Setting of Guide Letter Holder Assembly | Track in which Guide Letters To be placed |
|---|---|---|
| 4½" | 1½ | TT |

Step 2

In order to form a top track from the 4½ inch letters, the dividier bar 80 must be inserted into the bottom slot 86. Guide letters are now inserted, centered, and locked.

Step 4

Letter holder assembly 20 is positioned at the 1½ mark on the scale, and locked by means 27.

Step 5

Length of lettering, as indicated by the numbers on the guide letter holder, will be 37 inches.

Step 6

A 44-inch long workpiece is selected as appropriate. Workpiece is centered in holder and locked with 10-inch wedge.

Step 7

Depth of cut adjusted, routing commences.

Consider now a fourth sign to be routed:

Now is the time for all good men to come to the aid of ther country.

The letter size is to involve 1-inch letters, and the wood size is to b 1 × 10 stock.

Step 1

The book of tables associated with the specific machine at hand is now opened to the section displaying the various lettering arrangements that can be accomplished in 10-inch stock.

| Letter Size | Setting of Guide Letter Holder Assembly | Track in which Guide Letters To be placed |
|---|---|---|
| 1" | R½ | TT |
| 1" | G | TT |
| 1" | aa | TT |
| 1" | N | BT |

Step 2

It is typical to set up the longest line of lettering first, which in this instance is the third line. Since the book of tables call for the top track with regard to the third line, the top track of a size appropriate for 1-inch letters is formed by inserting the divider bar 80 in the top slot 82. The guide letters are then placed in position, centered, and locked by the bar 76 being pushed to the left.

Step 3

The guide letter holder 20 is then moved along the tracks 18 to the appropriate position for the third line. In this instance, it is positioned *aa,* after which the locking means 27 are utilized.

Step 4

The operator will be able to ascertain from the calibrations on the letter holder that the third line will be 19 inches long. Accordingly, a workpiece 22 inches long is selected.

Step 5

The workpiece is placed on the planar surface 35 of the workpiece holder and centered. It is then locked into position by the use of the wedge appropriate for use with 10-inch material, this being called a "10-inch wedge".

Step 6

The depth of cut is adjusted by means of rotation of the router with espect to the base 31, and then the third line is routed.

Step 7

Guide letters associated with the first line are now inserted in the top track and the guide letter holder assembly 20 is moved along the tracks 18 to position R½. The assembly 20 is now locked in positon and the top line of the sign is out.

Step 8

The guide letters for the second line are now inserted in the top track, the guide letter holder assembly is positioned at G, and the second line is routed.

Step 9

It is to be noted that the fourth line involves the use of the bottom track. This of course entails the divider bar 80 being placed in lower slot 86. The guide letters for the fourth line are now centered and locked, and the guide letter holder assembly is positioned at N on scale 23. The fourth line of the workpiece is not cut.

The foregoing description of the cutting of a four-line sign results in the production of a sign in which all the lines of lettering are in centered position on the workpiece, because of the inherent centered relationship of the guide letter holder assembly 20 and the workpiece holder assembly 34. However, it is to be realized that it may be desirable to create a sign with the lines even say on the left side. In such instance, it would only be necessary to set up the guide letters such that the left side of the letter blocks are portioned in the same place as the location the longest line, in this instance the position the third line came to, upon it being centered. A sign with the lines of lettering even on the right side can just as easily be made by lining up with the right edge of the longest line after it is centered. Furthermore, a sign having staggered lines of lettering can be made by lining up the first and third lines of guide letters on the left, and the second and fourth lines on the right. Quite obviously, therefore, the centering members on the guide letter holder have utility and value for purposes other than merely centering.

An additional purpose to which the centering numbers can be put involves an instance in which the letters of the sign are deliberately to be placed off center. Such an example might well involve the creation of a sign in which the lettering is to be offset to allow for a 4 × 4 post at one end of the sign. In this instance, the guide numbers would not be used for centering, but for obtaining the same offset for each sign created. In the instance in which a number of street signs are being made, the set up time would of course be minimal.

The way in which the foregoing signs were prepared points out a number of advantages of my machine, which may be delineated as follows:

1. No layout work was involved. My machine lends itself to the creation of a book of tables in which all possible combinations of letter sizes and lines are pre-calculated for standard size lumber.
2. No hand tools, such as wrenches, screwdrivers or the like were required in any phase of the setup of the machine for creating each next sign.
3. No measuring tapes, scales, or calipers were required, other than of course the numering devices intrinsic to the machine.
4. No calculations nor any pencil work of any kind was required.

I claim:

1. An engraving machine comprising an elongate guide letter holder having long edges, and an elongate workpiece holder disposed adjacent and essentially parallel thereto, one of the said holders being selectively movable relative to the other, while at all times preserving the essentially parallel relationship, means for preventing undesired relative movement of said holders, said guide letter holders having an elongate bar of substantial length slidably disposed along each of its long edges, with endwise movements of each rod controlling the movement of respective guide letter contacting members with respect to selected guide letters, a router assembly slidably mounted on an elongate bar disposed above and to one side of said holders, said router assembly comprising a stylus disposed above said letter holder, and a router disposed above said workpiece holder, said stylus and said router being relatively movable, such that upon an operator grasping said stylus and tracing one or more guide letters placed upon said guide letter holder, said router will be caused to undertake like movements with respect to said workpiece holder, and when energized, to perform desired cutting movements upon a workpiece secured thereon, the movable relation between said holders facilitating the construction of multiple line signs, and bias means biasing said stylus and router upwardly, such that operative portions of said stylus and router are respectively out of contact with the guide letters and workpiece except when the operator is grasping the stylus.

2. The engraving machine as recited in claim 1 in which each of said holders are equipped with rapidly operated locking means, such that selected guide letters can be quickly secured upon said guide letter holder, and a selected workpiece can be quickly secured on said workpiece holder, in alignment with the guide letter array.

3. An engraving machine comprising an elongate guide letter holder, and an elongate workpiece holder disposed adjacent thereto and essentially parallel therewith, said guide letter holder having an essentially planar upper surface upon which guide letters can be removably secured in a centered location, with said upper surface having a central portion that at all times is in aligned, operative relationship to the central portion of said workpiece mounting means, each of said holders being equipped with rapidly operated securing means, such that a selected array of guide letters can be quickly secured upon a selected portion of said guide letter holder, and a workpiece can be quickly secured on said workpiece holder, in appropriate alignment with said guide letter array, said workpiece holder having adjustment means enabling workpieces of different thicknesses to be readily accomodated, a movably mounted router assembly operatively disposed above said holders, comprising a stylus disposed above said guide letter holder, and a router disposed above said workpiece holder, said stylus and said router being repeatedly movable, such that upon an operator grasping said stylus and tracing around the guide letters arrayed upon said guide letter holder, said router will be caused to undertake like movements with respect to said workpiece holder, and when energized, to perform desired cutting movements upon a workpiece secured thereon.

4. The engraving machine as recited in claim 3 in which said router assembly is to a considerable extent counterbalanced by the use of spring means asserting an upward bias, thus to cause said stylus to normally clear said guide letters, and the cutting bit of the router to normally clear said workpiece, said upward bias being easily overcome by the operator upon grasphing said stylus.

5. The engraving machine as defined in claim 3 in which means are provided such that the distance between said holders can be easily altered,, while at all times maintaining the parallel relationship, thus simplifying the task of creating multiple lines of letters upon said workpiece.

6. The engraving machine as defined in claim 5 in which the distance between said stylus and said router is normally fixed.

7. The engraving machine as defined in claim 3 in which means are provided such that the distance between said guide letter holder and said workpiece holder is fixed, and means enabling the distance between said stylus and said router to be selectively altered to achieve a new spacing between the two, and thereafter be secured in the new relationship.

8. The engraving machine as defined in claim 3 in which said guide letter holder has a planar upper surface of rectangular configuration, guide letter contacting members disposed along each long edge of said guide letter holder, such that guide letters placed upon said planar upper surface in an endwise array can be caused to contact said guide letter contacting members, said guide letter contacting members being separately movable, and each being movable toward the other at the behest of the operator, thus making it possible for guide letters placed in a desired array on said planar surface to be secured firmly and rapidly in the selected position.

9. An engraving machine comprising an elongate guide letter holder, and an elongate workpiece holder disposed adjacent thereto, and essentially parallel therewith, each of said holders being equipped with rapidly operated securing means, such that a selected array of guide letters can be quickly secured upon a selected portion of said guide letter holder, and a workpiece can be quickly secured on said workpiece holder, in appropriate alignment with said guide letter array, a movably mounted router assembly operatively disposed above said holders, comprising a stylus disposed above said guide letter holder and a router disposed above said workpiece holder, said stylus and said router being relatedly movable, such that upon an operator grasping said stylus and tracing around the guide letters arrayed upon said guide letter holder, said router will be caused to undertake like movements with respect to said workpiece holder, and when energized, to perform desired cutting movements upon a workpiece secured thereon, said guide letter holder having a planar upper surface of rectangular configuration, guide letter contacting members disposed along each long edge of said guide letter holder, such that guide letters placed upon said planar upper surface in an endwise array can be caused to contact said guide letter contacting members, said guide letter contacting members being separately movable, and each being movable toward the other at the behest of the operator, thus making it possible for guide letters placed in a desired array on said planar surface to be secured firmly and rapidly in the selected position, an elongate bar of substantial length being slidably disposed along each long edge of said guide letter holder, with endwise movements of each rod controlling the movement of the respective guide letter contacting members with respect to the selected guide letters.

10. An engraving machine comprising an elongate guide letter holder, and an elongate workpiece holder disposed adjacent thereto, and essentially parallel therewith, each of said holders being equipped with rapidly operated securing means, such that a selected array of guide letters can be quickly secured upon a selected portion of said guide letter holder, and a workpiece can be quickly secured on said workpiece holder, in appropriate alignment with said guide letter array, a movably mounted router assembly operativey disposed above said holders, comprising a stylus disposed above said guide letter holder, and a router disposed above said workpiece holder, said stylus and said router being relatedly movable, such that upon an operator grasping said stylus and tracing around the guide letters arrayed upon said guide letter holder, said router will be caused to undertake like movements with respect to said workpiece holder, and when energized, to perform desired cutting movements upon a workpiece secured thereon, said guide letter holder having a planar upper surface of rectangular configuration, guide letter contacting members disposed along each long edge of said guide letter holder, such that guide letters placed upon said planar upper surface in an endwise array can be caused to contact said guide letters contacting members, said guide letter contacting members being separately movable, and each being movable toward the other at the behest of the operator, thus making it possible for guide letters placed in a desired array on said planar surface to be secured firmly and rapidly in the selected position, a plurality of parallel slots being disposed in said planar surface, each essentially parallel to said movable guide letter contacting members, with a divider bar being sized to fit closely within a selected one of said slots, said divider bar serving to react the thrust applied to said guide letters by one of said guide letter contacting members.

11. An engraving machine comprising an elongate guide letter holder and an elongate workpiece holder disposed adjacent thereto and essentially parallel therewith, each of said holders being equipped with rapidly operated securing means, such that a selected array of guide letters can be quickly secured upon a selected portion of said guide letter holder, and a workpiece can be quickly secured on said workpiece holder, in appropriate alignment with said guide letter array, a movably mounted router assembly operatively disposed above said holders, comprising a stylus disposed above said guide letter holder, and a router dispoed above said workpiece holder, said stylus and said router being relatedly movable, such that upon an operator grasping said stylus and tracing around the guide letters arrayed upon said guide letter holder, said router will be caused to undertake like movements with respect to said workpiece holder, and when energized, to perform desired cutting movements upon a workpiece secured thereon, said workpiece holder having a planar upper surface of rectangular configuration, an upstanding shoulder disposed along each long edge of said holder, and a wedge of a length similar to the length of said shoulders, said wedge, when placed along the inner surface of one of said shoulders, and being given a longitudinal movement, causing a workpiece residing on said planar upper surface to be moved into forceful contact with the inner surface of the other of said shoulders, thus securing the workpiece against dislodgement during a routine operation.

12. A router arrangement for router making precision signs comprising an elongate workpiece mounting means, latter means having an essentially planar upper surface and having workpiece securing means that enables a workpiece to be rapidly yet removably secured in a centered location on said surface, an elongate guide letter mounting means disposed adjacent said workpiece mounting means and being disposed essentially parallel thereto, said guide letter mounting means having an essentially planar upper surface upon which guide letters can be removably secured in a centered location, said guide letter mounting means being selectively movable with respect to said workpiece mounting means while at all times maintaining a parallel relation therewith, and at all times maintaining its center portion in an aligned, operative relationship to the center portion of said workpiece mounting means, and a movably mounted router assembly comprising a stylus means and a router means, said stylus means being relatedly movable with said router means, said router means normally being operably disposed above said workpiece securing means, said stylus means operably disposed above said guide letter mounting means and adpated to be grasped by an operator and used in controlling the movements of said router means, said stylus being in a position to trace around selected guide letters secured on said planar upper surface of said guide letter mounting means, with such movements of said stylus causing said router means, when energized, to cut the selected letters in the workpiece secured on said planar upper surface of said workpiece securing means.

13. The router arrangement is defined in claim 12 in which means are provided for supplying an upward bias to said router assembly, thus causing the bit of said router means to normally clear any workpiece residing on said workpiece mounting means.

14. The router arrangement as defined in claim 12 in which said guide letter mounting means is of generally rectangular construction, said guide letter mounting means being of substantial length in one direction, and having a comparatively small dimension in the direction perpindicular to said one dimension, guide letter contacting members disposed along each long edge of said guide letter mounting means, such that guide letters placed upon said planar upper surface in an endwise array can be caused to contact said guide letter contacting members, said guide letter contacting members being separately movable, and each being movable toward the other at the behest of the operator, thus making it possible for guide letters placed in a desirec array on said planar surface to be secured firmly in the selected position.

15. The guide letter holder as defined in claim 14 in which an elongate bar of substantial length is slidably disposed along each long edge of said guide letter mounting means, with endwise movements of each rod controlling the movement of the respective guide letter contacting members with respect to the selected guide letters.

16. The router arrangement as defined in claim 12 in which said workpiece mounting means has a planar upper surface of rectangular configuration, an upstanding shoulder disposed along each long edge of said workpiece mounting means, and a wedge of a length similar to the length of said shoulders, said wedge, when placed along the inner surface of one of said shoulders, and being given a longitudinal movement, causing a workpiece residing on said planar upper surface to be moved into forceful contact with the inner surface of the other of said shoulders, thus securing the workpiece against dislodgement during a routing operation.

17. A router arrangement for making precision signs comprising an elongate workpiece mounting means, latter means having an essentially planar upper surface and having workpiece securing means that enables a workpiece of selected thickness to be rapidly yet removably secured in a centered location on said surface, an elongated guide letter mounting means disposed adjacent said workpiece mounting means and being disposed essentially parallel thereto, said guide letter mounting means having an essentially planar upper surface upon which guide letters can be removably secured in a centered location, with said upper surface having a central portion that at all times is in an aligned, operative relationship to the central portion of said workpiece mounting means; and a movably mounted router assembly comprising a stylus means and a router means, said stylus means being relatedly movable with said router means, said router means having a router bit, and normally being operably disposed above said workpiece securing means, said stylus means and said router means being biased upwardly, with its router bit out of contact with such workpiece, said stylus means being operably disposed above said guide letter mounting means and adapted to be grasped by an operator and used in controlling the movements of said router means, said stylus being in a position to trace around selected guide letters secured on said planar upper surface of said guide letter mounting means, with the operator's movements of said stylus causinf the bias to be overcome, and the bit of said router means, when latter is energized, to cut the selected letters in the workpiece secured on the planar upper surface of said workpiece securing means, and height adjustment means associated with said workpiece mounting means, enabling workpieces of different thickness to be readily accomodated.

18. The router arrangement as defined in claim 17 in which means are provided such that the distance between said mounting means can be easily altered, while at all times maintaining the parallel relationship, thus simplifying the task of creating multiple lines of letters upon said workpiece.

19. The router arrangement as defined in claim 18 in which the distance between said stylus and said router is normally fixed.

20. The router arrangement as defined in claim 17 in which the distance between said guide letter holder and said workpiece holder is fixed, whereas means are provided such that the distance between said stylus and said router can be selectively altered, thus simplifying the task of creating multiple line signs.

21. The router arrangement as defined in claim 17 in which said guide letter holder has a planar upper surface od rectangular configuration, a guide letter contacting member disposed along at least one long edge of said guide letter holder, such that guide letters placed upon said planar upper surface in an endwise array can be caused to contact said guide letter contacting member, said guide letter contacting member being movable toward said guide letters at the behest of the operator, thus making it possible for guide letters plaed in a desired array on said planar surface to be secured firmly and rapidly in the selected position.

22. The router arrangement as defined in claim 21 in which an elongate bar of substantial length is slidably disposed along said long edge of said guide letter mounting means, with endwise movements of said rod controlling the movement of said guide letter contacting member with respect to the selected guide letters.

23. A router arrangement for making precision signs, including mutiline signs, comprising an elongate workpiece mounting means, latter means having an essentially planar upper surface and having workpiece securing means that enables a workpiece to be rapidly yet removably secured in a desired location on said surface, an elongate guide letter mounting means disposed adjacent said workpiece mounting means and being disposed eseentially parallel thereto, said guide letter mounting means having an essentially planar upper surface upon which guide letters can be removably secured in a centered location, means enabling the distance between said workpiece mounting means and said guide letter mounting means to be selectively altered, while at all times maintaining the parallel relationship, and at all times maintaining its center portion in alignment with the center portion of said workpiece mounting means, and a movably mounted router assembly comprising a stylus means and a router means, said stylus means being relatedly movable with said router means, said router means normally being operably disposed above said workpiece securing means, said stylus means being operably disposed above said guide letter mounting means and adapted to be grasped by an operator and used in controlling the movements of said router means, said stylus being in a position to trace around selected guide letters secured on said planar upper surface of said guide letter mounting means, with such movements of said stylus causing said router means, when energized, to cut the selected letters in the workpiece secured on said planar upper surface of said workpiece securing means.

24. The router arrangement as recited in claim 23 in which said router assembly is to a considerable extent counterbalanced by the use of spring means asserting an upward bias, thus to cause said stylus to normally clear said guide letters, and the cutting bit of the router to normally clear said workpiece, said upward bias being easily overcome by the operator upon grasping said stylus.

25. The router arrangement as defined in claim 23 in which said guide letter mounting means is of generally rectangular construction, said guide letter mounting means being of substantial length in one directoon, and having a comparatively small dimension in the direction perpindicular to said one dimension, a guide letter contacting member disposed along at least one long edge of said guide letter mounting means, such that guide letters placed upon said planar upper surface in an endwise array can be caused to contact said guide letter contacting member, said guide letter contacting member being movable toward the guide letters at the behest of the operator, thus making is possible for guide letters placed in a desired array on said planar surface to be secured firmly in the selected position.

26. The guide letter holder as defined in claim 25 in which an elongate bar of substantial length is slidably disposed along said long edge of said guide letter holder, with endwise movements of said rod controlling the movement of said guide letter contacting member with respect to the selected guide letters.

27. The guide letter holder as defined in claim 23 in which a plurality of parallel slots are disposed in said planr surface, each essentially parallel to said movable guide letter contacting member, with a divider bar being sized to fit closely within a selected one of said slots, said divider bar serving to react the thrust applied to said guide letters by said guide letter contacting member.

28. An engraving machine as defined in claim 23 in which said workpiece mounting means has a planar upper surface of rectangular configuration, an upstanding shoulder disposed along each long edge of said means, and a wedge of a length similar to the length of said shoulders, said wedge, when placed along the inner surface of one of said shoulders, and being given a longitudinal movement, causing a workpiece residing on said planar upper surface to be moved into forceful contact with the inner surface of the other of said shoulders, thus securing the workpiece against dislodgement during a routing operation.

* * * * *

UNITED STATES PATENT OFFICE
CERTIFICATE OF CORRECTION

Patent No. 4,098,170            Dated July 4, 1978

Inventor(s) John A. Russell

It is certified that error appears in the above-identified patent and that said Letters Patent are hereby corrected as shown below:

Column 2, line 18, "advntageous" should read --advantageous--;
          line 35, "wil" should read --will--.

Column 4, line 57, "te" should read --the--.
Column 5, line 61, "weight." should read --weight,--.

Column 16, first table should appear as follows:

| Letter Size | Setting of Guide Letter Holder Assembly | Track in which Guide Letters To be placed |
|---|---|---|
| 1" | aa½ | TT |
| 1" | ee | TT |
| 1" | U½ | BT |
| 2" | T½ | BT |
| 3" | S | BT |

UNITED STATES PATENT OFFICE
CERTIFICATE OF CORRECTION

Patent No. 4,098,170　　　　　　　　　Dated July 4, 1978

Inventor(s) John A. Russell

It is certified that error appears in the above-identified patent and that said Letters Patent are hereby corrected as shown below:

Column 16, second table should appear as follows:

| Letter Size | Setting of Guide Letter Holder Assembly | Track in which Guide letters To be placed |
|---|---|---|
| 1" | K½ | TT |
| 1" | A½ | TT |
| 1" | V | BT |
| 1" | G | TT |
| 1" | aa | TT |
| 1" | I½ | TT |
| 2" | T½ | BT |
| 2" | F | TT |
| 2" | L | TT |
| 1" | V | BT |
| 3" | F | TT |

UNITED STATES PATENT OFFICE
CERTIFICATE OF CORRECTION

Patent No. 4,098,170            Dated July 4, 1978

Inventor(s) John A. Russell

It is certified that error appears in the above-identified patent and that said Letters Patent are hereby corrected as shown below:

Column 16, third table should appear as follows:

| Letter Size | Setting of Guide Letter Holder Assembly | Track in Which Guide Letters to Be Placed | Letter Size | Setting of Guide Letter Holder Assembly | Track in Which Guide Letters to Be Placed |
|---|---|---|---|---|---|
| 1" | U | TT | 1" | U | TT |
| 1" | X | TT | 2" | J½ | TT |
| 1" | B | TT | 1" | V | BT |
| 1" | V | BT | | | |
| 1" | R½ | TT | 2" | V | TT |
| 1" | G | TT | 1" | B½ | TT |
| 1" | aa | TT | 1" | V | BT |
| 1" | U | TT | 1" | R | TT |
| 1" | D½ | TT | 3" | B | TT |
| 2" | V | BT | | | |
| 3" | K½ | TT | 2" | V | TT |
| | | | 3" | V | BT |
| 3" | R | TT | 3" | T | TT |
| 1" | aa | TT | 2" | T | BT |
| 4½ | P | TT | | | |

UNITED STATES PATENT OFFICE
CERTIFICATE OF CORRECTION

Patent No. 4,098,170                 Dated  July 4, 1978

Inventor(s) John A. Russell

It is certified that error appears in the above-identified patent and that said Letters Patent are hereby corrected as shown below:

Column 17, line 36, "ar" should read --are--.
Column 18, line 63, "ar" should read --are--.
Column 19, line 11, "nd" should read --and--;
          line 40, "Step 2" should read --Step 3--;
          line 42, "dividier" should read --divider--;

lines 65 & 66 should appear as follows:
             --Now is the time
               for all good men
               to come to the aid
               of their country.--;
          line 68, "b" should read --be--.

Column 20, line 68, "not" should read --now--.
Column 21, line 10, "portioned" should read --position--;

line 44, "numering" should read --numbering--.
Column 22, line 51, "grasphing" should read --grasping--.
Column 25, line  2, "adpated" should read --adapted--;
          line 29, "desirec" should read --desired--.
Column 26, line 12, "causinf" should read --causing--;
          line 37, "od" should read --of--;
          line 44, "plaed" should read --placed--;
          line 54, "mutiline" should read --multiline--.

UNITED STATES PATENT OFFICE
CERTIFICATE OF CORRECTION

Patent No. 4,098,170          Dated July 4, 1978

Inventor(s) John A. Russell

It is certified that error appears in the above-identified patent and that said Letters Patent are hereby corrected as shown below:

Column 27, line 28, "directoon" should read --direction--.
Column 28, line 15, "planr" should read --planar--.

Signed and Sealed this

Sixth Day of February 1979

[SEAL]

Attest:

RUTH C. MASON
*Attesting Officer*

DONALD W. BANNER
*Commissioner of Patents and Trademarks*